INVENTOR
CLAUDE R. MYERS
BY
ATTORNEYS

INVENTOR
CLAUDE R. MYERS

Jan. 19, 1960     C. R. MYERS     2,921,651
AIR-COOLED DISC BRAKE WITH SEGMENTAL ACTUATOR DISC
Filed May 9, 1957     4 Sheets-Sheet 3

INVENTOR
CLAUDE R. MYERS
BY Robert Cobb
ATTORNEYS

Jan. 19, 1960     C. R. MYERS     2,921,651
AIR-COOLED DISC BRAKE WITH SEGMENTAL ACTUATOR DISC
Filed May 9, 1957     4 Sheets-Sheet 4

INVENTOR
CLAUDE R. MYERS
BY
ATTORNEYS

United States Patent Office 2,921,651
Patented Jan. 19, 1960

2,921,651
AIR-COOLED DISC BRAKE WITH SEGMENTAL ACTUATOR DISC

Claude R. Myers, Galien, Mich., assignor, by mesne assignments, to Lambert Brake Corporation, St. Joseph, Mich., a corporation of Michigan Application May 9, 1957, Serial No. 658,141

3 Claims. (Cl. 188—73)

The present invention relates to brakes, and more particularly to an improved form of air-cooled segmental, self-energizing disc brake for automotive and other wheeled vehicles or for braking rotatable members of various types.

It is among the objects of the invention to provide a brake mechanism of this type which is of extremely simplified construction, with fewer parts tending to afford a trouble-free design.

Another object of this invention is to provide a novel means for maintaining parallelism between the lining bearing members and the friction surfaces of the brake rotor.

A further object of this simplified brake is to provide a positive mechanical adjusting means which inherently eliminates the noises usually attending self-energizing brakes.

Still another object is to provide a construction in which the brake mechanism does not "clock" in the normal sense of the word as usually applied to self-energizing brakes.

Also, it is an object of the invention to provide an improved brake construction which is very powerful and attended with smooth and efficient operating characteristics.

An additional object is to provide a simplified brake construction which is easy and inexpensive to manufacture.

Other objects and advantages of the invention will be hereinafter described and the novel features thereof defined in the appended claims.

Figure 1:
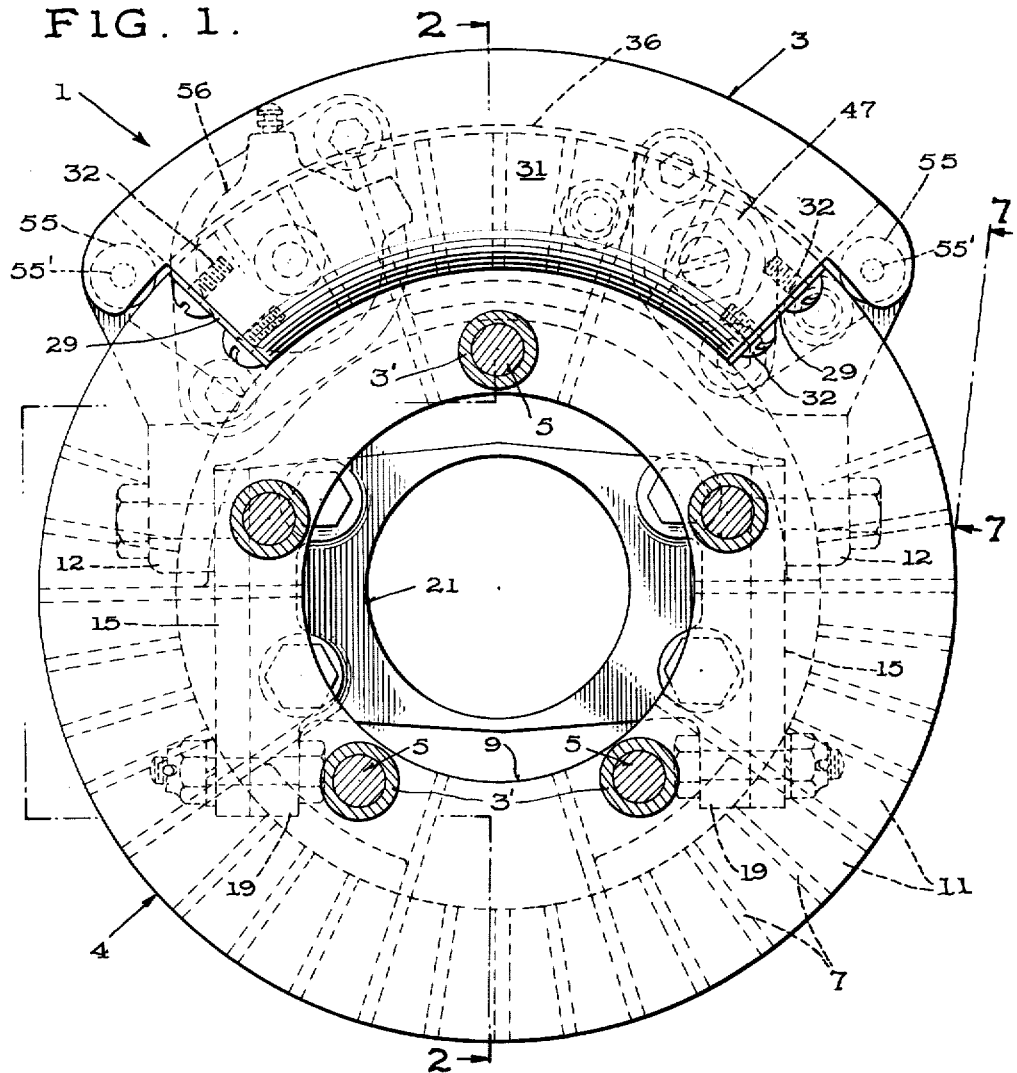
Fig. 1 is an outboard side elevational view of a brake in accordance with the invention, with the mounting means shown in cross-section as taken on the line 1—1 of Fig. 2.

Like reference characters designate corresponding parts throughout the figures of the drawings, wherein 1 generally denotes the brake unit of the invention, which is shown mounted on a wheel hub 2 for purposes of illustration, said hub and wheel being illustrated in broken outline. The brake has the form of an air-cooled, segmental disc, self-energizing type, and comprises an arcuate shaped, radially extended, inverted, generally U-shape housing 3, through which a rotor member 4 rotates. The rotor 4 is secured in spaced relation by means of spacers 3' to the flange of the rotatable wheel hub 2 by means of a plurality of wheel bolt and nut assemblies 5, said rotor being generally disc-shaped and provided with spaced annular friction surfaces on its opposite faces as at 6 and 8 respectively and having axially extended ribs 7 cast preferably integral therebetween. The rotor is further provided with a central aperture 9 and with a plurality of holes 10 equally spaced thereabout for cooperative mounting on the wheel hub 2 by nut and bolt assemblies 5. Said rib members 7 define air cooling pockets 11 between each adjacent pair of ribs. The rotor, accordingly, resembles a version of the so-called "Sirocco" fan, and, being attached to the wheel, is the only rotating member of the brake.

The brake housing 3 is preferably provided with a pair of depending mounting extensions or ears 12 having bolt-receiving holes 13 therethrough for cooperation with respectively aligned countersunk holes 14 in one end of each of a pair of mounting links 15. Flat-head bolt and nut assemblies 16 secure the housing 3 and links 15 together, said nuts being preferably cotter-pinned on the bolts to prevent loosening due to external road vibration factors.

Figure 3:
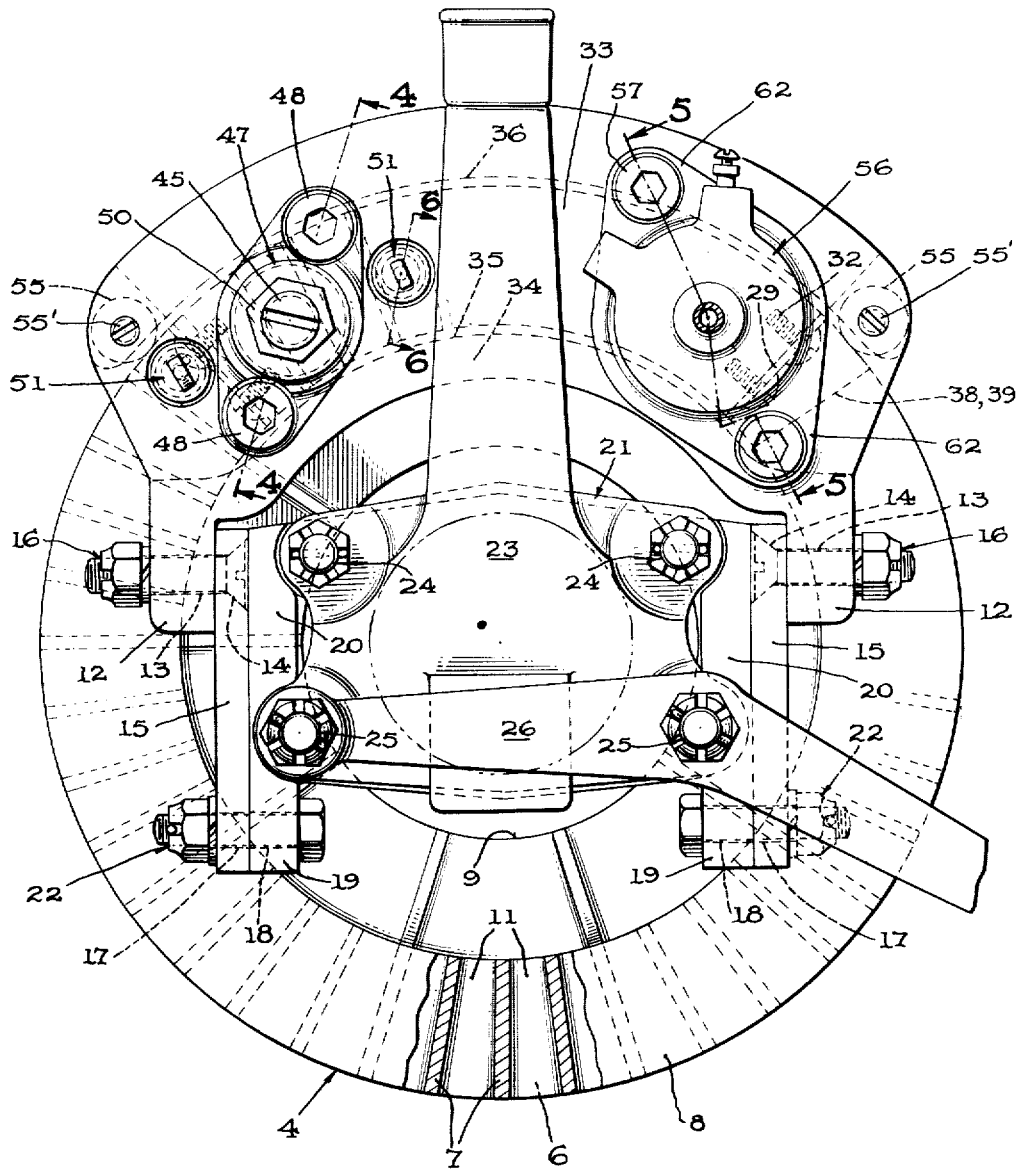
Fig. 3 is an elevational view of the brake and its mountings as seen from the inboard side, with a fragmentary portion of the rotor broken away.

The links 15, respectively, have bolt-receiving holes 17 at their ends opposite to the countersunk mounting holes 14, said holes 17 aligning with similar bolt-receiving holes 18 in the depending portion 19 of the laterally winged or flanged areas 20 of a brake mounting adapter plate generally denoted at 21 and best seen in Figs. 1 and 3. The links 15 are pivotally but securely fastened to adapter plate 21 at 18 by means of nut and bolt assemblies 22, the nuts of which are also preferably cotter-pinned on to positively prevent loosening.

The links 15 provide a novel and simple means for maintaining parallelism between friction lining bearing members and the respective friction surfaces of the rotor (best seen in Fig. 2), being pivotally mounted by said nut and bolt assemblies 16 and 22 as herein described. The links provide a lightly restrained pivotal mounting of housing 3 inasmuch as they constitute pivotal connecting arms between the housing 3 and the brake mounting adapter plate 21 which is fastened to the steering knuckle as to be described hereinafter.

Figure 2:
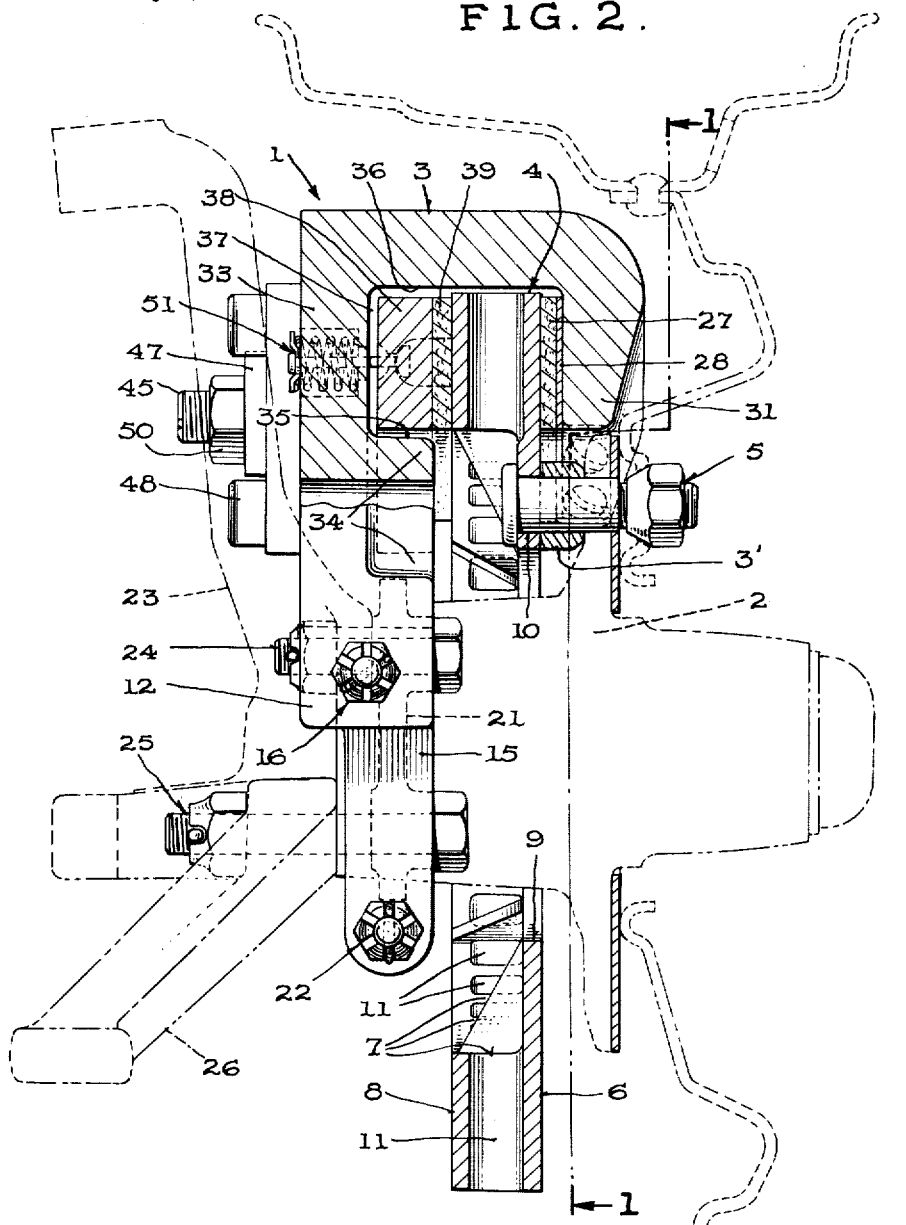
Fig. 2 is a vertical cross-section through the brake, as taken substantially on the line 2—2 of Fig. 1, with certain of the parts shown in elevation.

The housing 3, by means of the links 15 and the adapter plate 21, is pivotally fixed to the steering knuckle 23 thereby preventing radial movement of the housing 3, but allowing axial movement thereof. This is accomplished by a pair of bolt and nut assemblies 24 which hold the upper portion of the adapter plate 21 to the steering knuckle, and a second pair of bolt and nut assemblies 25, in addition to attaching the adapter plate to the steering knuckle, also attach said adapter plate 21 to he steering arm 26, as illustrated in Figs. 2 and 3 of the drawings.

Within the inverted generally U-shaped portion of the housing 3, there is mounted a pair of brake disc segments disposed in opposed spaced relation at opposite sides of the rotor 4 for frictional engagement with the respectively opposed friction surfaces 6, 8 of the rotor.

Figure 8:
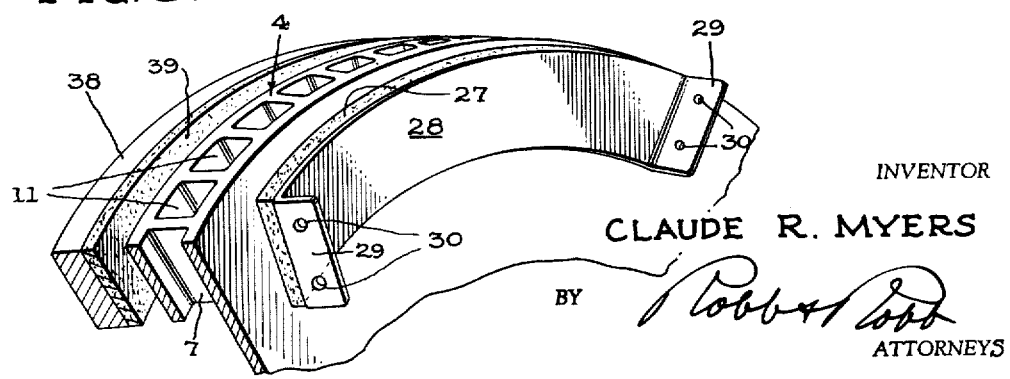
Fig. 8 is a fragmentary exploded perspective view of the rotor and the associated lining bearing members.

A lining element 27 is attached to a steel mounting plate 28, as by bonding, said mounting plate being of arcuate shape and having laterally extended end flanges 29 with holes 30 for mounting thereof, as best seen in Fig. 8. Said lining and mounting plate are attached to the inner face of the outboard arcuate overhanging wall 31 of the arcuate housing 3, by any suitable means such as screws 32, and with the face of the lining material disposed in parallel relation to the friction face 6 of the rotor 4.

The inboard wall 33 of the housing 3 is also of arcuate shape and serves as a backing plate and torque absorbing member as will be more fully discussed hereinafter. The wall 33 has a substantially flat outer surface and an axially extended interior flange 34 terminating preferably parallel to the rear surface and also disposed in parallel relation to the rotor faces. The flange 34 has an arcuate shape with its arcuate upper surfaces 35 disposed generally concentric with the arcuate interior 36 of the outer peripheral wall of the housing 3 about the axis of the wheel. Said arcuate shoulder 34 defines an arcuate recessed pocket 37 which houses an arcuately shaped primary disc segment 38 hereinafter to be referred to as the primary actuator disc, and to which the lining segment 39 is preferably bonded. The primary disc 38 is so disposed that the friction face of the brake lining segment 39 is parallel to the friction face 8 of rotor 4.

Figure 4:
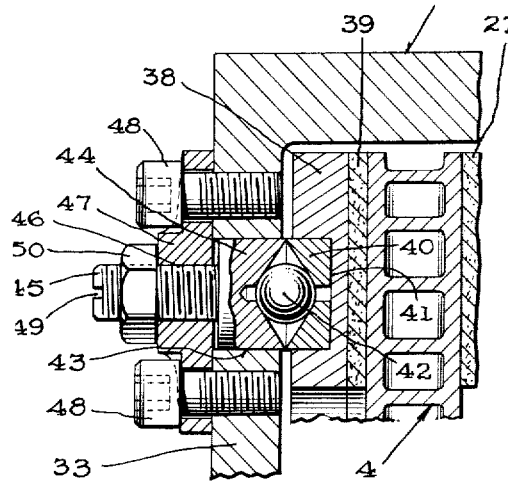
Fig. 4 is a cross-sectional view through the self-energizing and lining adjustment means, as taken on line 4—4 of Fig. 3.

The primary disc 38 has at least one insert 40 seated in a counterbore 41 therein, said insert 40 being preferably cylindrical, with one flat end seating in said counterbore 41 and the opposite end internally coned or concaved with a spherical apex providing a ramped seat for cooperative seating therein of a spherical energizing ball 42, as best seen in Fig. 4. Opposite the insert 40 in the primary disc, there is provided a counterbore 43 through the inboard wall 33 of the housing 3 and so disposed to receive a generally similar insert 44 which is complementary to the insert 40. The insert 44 is provided at its non-concave end with a threaded stud 45 which extends through a threaded hole 46 in a suitable pressure pad 47, said pad 47 being cooperatively secured to the inboard face of housing 3 by any suitable means such as cap screws 48.

The insert 44 is thus mounted for manual adjustment to compensate for brake lining wear, said adjustment, which will be more fully described hereinafter, being accomplished by rotating the threaded stud with an appropriate tool, such as a screw driver, to engage in slot 49. The threaded stud 45 is locked in selective adjustments by means of a lock nut 50.

Figures 6, 7:
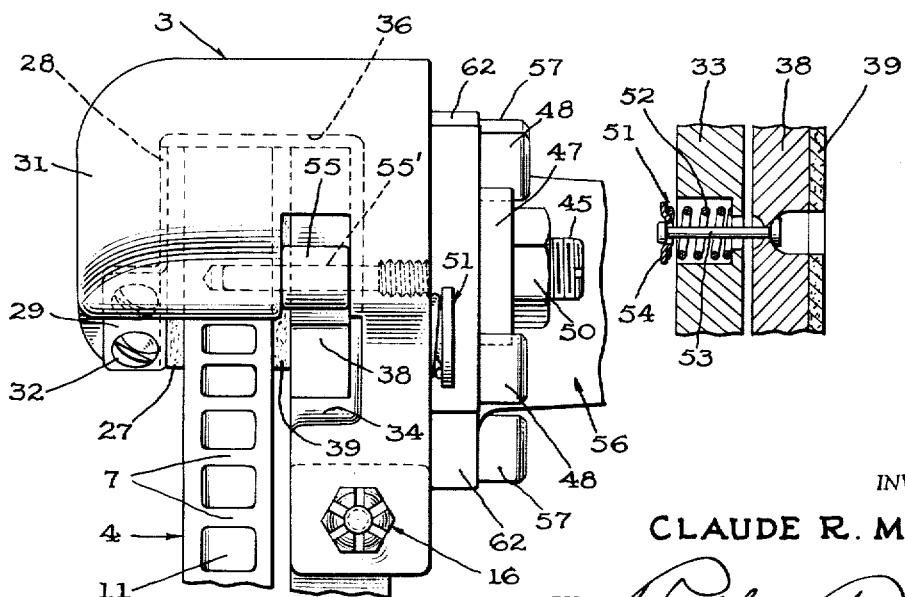
Fig. 6 is a cross-sectional view taken on line 6—6 of Fig. 3 through one of the two return spring means which secures the primary disc to the housing.
Fig. 7 is a fragmentary side elevation view of the brake rotor and housing structure as seen on line 7—7 of Fig. 1.

The respective inserts 40 and 44 are so disposed that the peripheries of their respective concave faces meet in opposed relation with the energizing ball trapped therebetween, thereby providing a means for maintaining a parallel relationship between the primary disc 38 and the rotor 4. The primary disc 38 is further maintained in its proper relationship to the housing and rotor preferably by means of at least two return spring assemblies 51, shown in cross-section detail in Fig. 6. Each return spring assembly comprises a conventional compression spring 52 which is held in place by a conventional spring pin 53 and cap 54.

To further maintain the primary disc 38 in its proper operative relation to the interior of the housing 3, at least one pair of rollers 55 is disposed within recessed areas at the opposite ends of the housing 3, said rollers 55 being held in place by means of axle pins 55' and disposed to engage tangentially with the outer circumferential periphery of the segmental primary disc 38. The rollers 55 thereby provide a friction free pilot for the primary disc 38 in its relation to the housing during actuation and energization of the brake, which will be more fully explained hereinafter.

Figure 5:
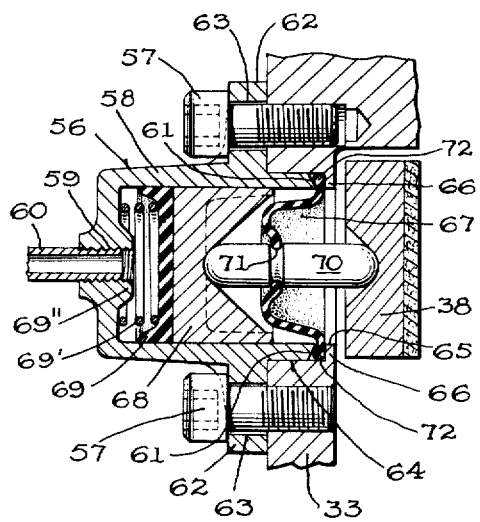
Fig. 5 is a cross-sectional view through the brake actuating wheel cylinder, as taken substantially on line 5—5 of Fig. 3.

Suitable means is provided for actuating the primary disc into frictional engagement with the rotor, and in the illustrated embodiment, said means is in the form of a single fluid actuator wheel cylinder assembly 56 mounted on the inboard wall 33 of the housing 3, as best seen in Figs. 3 and 5. Said assembly 56 may be secured to the housing by any suitable means, such as by cap screws 57. The wheel cylinder assembly preferably comprises a generally cylindrical body 58 closed off at one end except for a fluid inlet-outlet orifice or port 59 to which a suitable fluid conduit 60 is attached as by threaded engagement. The other end of the cylindrical body terminates in an open skirt or collar, with the outer periphery thereof chamfered as at 61. The cylinder body is also provided with a bleed screw at the upper side thereof near its closed end, as best seen in Fig. 3. Intermediate the ends of the cylinder are at least two flanged mounting ears 62 apertured at 63 through which pass cap screws 57 to secure the cylinder to the housing wall. Counterbored from the inboard side of said housing wall is a hole 64 into which the open or skirted end 61 of the wheel cylinder body 56 cooperatively seats. A hole 65 concentric with but of less diameter than the counterbore 64 is provided in the outboard face of the rear wall 33 and together with said counterbore, defines a shoulder or seat 66 against which the outer periphery of an enclosure boot or dust shield 67 is seatingly engaged by the chamfered peripheral skirt 61 of the wheel cylinder body, as best seen in Fig. 5.

Said wheel cylinder assembly further includes a generally cylindrical piston 68, one end of which is flat for mating engagement with a combined fluid seal and flat-bottomed pressure spring cup member 69. Said combined fluid seal and spring cup 69 is preferably made of a flexible rubber or other resilient material which takes the form of a flat disc having a rolled or somewhat cupped periphery as shown in Fig. 5. The outside diameter of the seal-cup member is circumferentially smooth for close sealing contact with the inside walls of the wheel cylinder. Seated within the cup 69 is a compression spring 69', the other end of said spring seating around a raised boss 69" on the inside face of the fluid inlet-outlet port end of the wheel cylinder, as seen in Fig. 5. The spring normally urges the cup 69 into sealing engagement with the side walls of the cylinder as it urges the piston 68 and a plunger 70 into snug engagement against the primary disc 38, thereby assuring an anti-rattle assembly. The other end of said piston is internally coned, with preferably a spherical apex or seat in which a spherical ended toggle-type plunger 70 may rock. The other end of plunger 70 spherically mates in similar fashion in the same type of concave seat provided in complemental relation in the inboard surface of the primary disc 38.

Intermediate the spherical ends of plunger 70, an annular groove 71 is provided in the body thereof to receive a flexible disc-shaped enclosure boot or dust shield 67 having a central hole of less diameter than the diameter of the annular groove 71. The dust shield 67 preferably has an enlarged or beaded periphery 72, and said dust shield is of a larger diameter than the inside diameter of the wheel cylinder body 58 so that when the central opening of the flexible shield has been snugly fitted over the plunger and into the annular groove 71 of the toggle plunger 70, the shield has enough material to form a cup before its beaded periphery 72 is secured on seat 66 by the chamfered end 61 of the cylinder body 58. The purpose of the arrangement is to provide flexibility or mobility to the dust shield during the braking operation which causes the plunger 70 to slightly rock and roll within its spherical seats, as will be more fully disclosed hereinafter.

The foregoing clearly illustrates one structural embodiment of the brake or friction device of this invention and the operation thereof is as follows:

Assuming the brake to be in the disengaged position, in order to effect engagement, fluid is transmitted by way of conduit 60 through the inlet-outlet port 59, said fluid forcing the piston 68 outwardly. As the piston moves outwardly, the plunger 70 thrusts against the primary disc 38, thereby forcing said primary disc outwardly and into engagement with the friction surface 8 of the rotor 4. At the same time, an equal and opposite thrust is exerted against the inboard wall of housing 3, thereby pulling lining segment 27 carried by the outboard wall 31 of the housing into engagement with the opposite face 6 of rotor 4. When the frictional contact between said surface 8 and the lining material 39 carried by the primary disc 38 is made, the primary disc begins to absorb the torque of the rotor and in doing so, energizing ball 42 is forced up the ramped inclines of inserts 40 and 44 respectively, thus exerting additional braking torque against the rotor, which in turn retards and stops the wheel of the vehicle on which it is mounted. This is commonly known as self-energization.

Upon engagement of the lining material 39 against the rotor 4, the drag torque aforesaid causes the primary disc 38 to move slightly rotatively, but only to the extent of the energizing action, and the plunger 70 is so constructed, as described hereinbefore, and so disposed that it pivots or cocks in its spherical mounting to compensate for the energizing rotative movement of the primary disc aforesaid.

Upon release of the fluid braking pressure, the primary disc is returned to its non-braking position and the plunger 70 restored to its non-cocked position by means of the two return spring assemblies 51.

As the lining material wears down, simple and positive mechanical adjustment is accomplished as will hereinafter be described, with the only change of position of the brake members from non-worn position to full-worn position being an increase in space between the inboard wall of the housing 3 and the primary disc 38, and a corresponding decrease in space between the rotor face 6 and the inboard surface of the outboard housing wall 31.

Brake adjustment is preferably accomplished while in the non-applied position, the various brake components having been restored to their non-braking positions and with the ball seated in the deepest part of the inserts 40 and 44. Thus, by turning the threaded stud 45, which in turn advances insert 44 through the inboard wall 33 of the housing, the advance of said insert forces the primary disc 38 into contact with rotor 4. The primary disc is permitted to move axially towards and away from the rotor 4. When frictional contact is made between lining segment 39 and rotor 4, the housing 3, which supports lining segment 27, moves said lining segment 27 into frictional contact with rotor 4. The rotor 4 is fixed against axial movement by nut and bolt assemblies 5. The axial movement of housing 3 is permitted by its pivotal connection with links 15 which, in turn, are pivotally connected to adapter 21. A light, frictional drag on rotor 4 by lining segment 27 is desirable, in that it does not affect the function of the brake and maintains the rotor surfaces free of foreign materials.

After the lining segments come into firm contact with the friction surfaces of the rotor, the stud 45 is then backed off slightly a predetermined amount to give the brake members their proper running clearance, and the stud is then locked to the pressure pad 47 by means of a lock nut 50. The adjusting movement created by said manual adjustment of the stud is axial only, and said adjustment restores the plunger 70 to its non-cocked position.

The brake or friction device of this invention is designed to operate equally well and efficiently in both forward and reverse directions, the operation thereof being accomplished in the same manner for each direction.

While the details of the invention have been described specifically for the embodiment illustrated, it is to be understood that other changes and modifications may be resorted to by those skilled in the art without departing from the spirit and scope thereof as defined in the appended claims.

I claim:

1. A friction device of the class described, comprising a generally arcuate shaped non-rotatable housing, said housing having a cross-section of substantially inverted U-form and having depending opposed apertured mounting ears, a pair of separate mounting links apertured at both ends and having one end of each link pivotally secured to the respective depending mounting ears of the housing, an adapter plate for securing the housing to an assembly on which the friction device is to be used, said links having their ends opposite the housing connection pivotally secured to said adapter plate, a primary actuator disc segment carried by said housing and mounted for both axial and slight rotative movements about the axis of said housing, at least one segmental friction disc disposed in opposed spaced relation to the primary disc segment and fixed to the housing, an annular rotor disc for attachment to and rotation with a rotary member, said rotor disc being disposed between said disc segments, means for axially shifting said primary disc segment into engagement with said rotor, self-energizing means carried by said housing and said primary disc for effecting a servo action to increase the frictional torque, manual adjustment means for effecting wear take-up, and release means to return the friction members to their non-effective positions.

2. A friction device of the class described, comprising a non-rotatable housing, a primary actuator disc segment carried by said housing and mounted for both axial and slight rotative movements about the axis of said housing, at least one segmental friction disc disposed in opposed spaced relation to the primary disc segment and fixed to the housing, an annular rotor disc for attachment to and rotation with a rotary member, said rotor disc being disposed between said disc segments, means for axially shifting said primary disc segment into engagement with said rotor, self-energizing means carried by said housing and said primary disc for effecting a servo action to increase the frictional torque, manual adjustment means for effecting wear take-up, yieldable release means to return the friction discs to their non-effective positions, said primary disc shifting means including an actuator cylinder assembly comprising a cylinder body having one closed end, said closed end having an operating fluid inlet-outlet port, the opposite end of said cylinder body being open and operatively seating on said housing, a piston disposed in said cylinder body, a thrust plunger interposed between said piston and the primary actuator disc segment, a dust shield embracing the thrust plunger and extending across the open end of said cylinder body, said dust shield having its peripheral edge clamped between the open end of the cylinder body and the housing, a combined piston seal and spring retaining cup interposed between the piston and the closed end of the cylinder body, and a compression spring seated in said retaining cup and abutting the closed end of the cylinder body.

3. A friction device of the class described, comprising a non-rotatable housing, a primary actuator disc segment carried by said housing and mounted for both axial and slight rotative movements about the axis of said housing, at least one segmental friction disc disposed in opposed spaced relation to the primary disc segment and fixed to the housing, an annular rotor disc for attachment to and rotation with a rotary member, said rotor disc being disposed between said disc segments, means for axially shifting said primary disc segment into engagement with said rotor disc, self-energizing means carried by said housing and said primary disc for effecting a servo action to increase the frictional torque, manual adjustment means for effecting wear take-up, said self-energizing means and manual adjustment means comprising a pair of complemental ramped inserts each having a spherical ball seat, an energizing ball trapped therebetween, one of said inserts being carried by the primary actuator disc segment, the other complemental insert being carried by the housing, said latter insert having a threaded adjustment stud projecting exteriorly of the housing, a separate unitary pressure pad removably carried by said housing and having threaded engagement with the threaded adjustment stud, yieldable release means to return the friction members to their non-effective positions, and means for locking the adjustable insert in selective adjusted positions.

References Cited in the file of this patent

UNITED STATES PATENTS

| | | |
|---|---|---|
| 2,320,286 | Lambert | May 25, 1943 |
| 2,373,572 | Lambert | Apr. 10, 1945 |
| 2,474,961 | Sneed | July 5, 1949 |
| 2,575,578 | Bricker | Nov. 20, 1951 |
| 2,614,662 | Hawley | Oct. 21, 1952 |
| 2,655,229 | Eksergian | Oct. 13, 1953 |
| 2,655,230 | Buyze | Oct. 13, 1953 |
| 2,754,936 | Butler | July 17, 1956 |
| 2,773,567 | Fairchild | Dec. 11, 1956 |

FOREIGN PATENTS

| | | |
|---|---|---|
| 982,138 | France | Jan. 24, 1951 |
| 1,129,639 | France | Sept. 10, 1956 |